United States Patent
Aryafar et al.

(10) Patent No.: US 9,660,793 B2
(45) Date of Patent: May 23, 2017

(54) LEVERAGING FULL DUPLEX FOR RATE ADAPTATION IN WIRELESS LANS

(71) Applicant: INTEL CORPORATION, Santa Clara, CA (US)

(72) Inventors: Ehsan Aryafar, Santa Clara, CA (US); Ping Wang, Santa Clara, CA (US); Po-Kai Huang, Santa Clara, CA (US); Shilpa Talwar, Los Altos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 56 days.

(21) Appl. No.: 14/751,945

(22) Filed: Jun. 26, 2015

(65) Prior Publication Data
US 2016/0380744 A1    Dec. 29, 2016

(51) Int. Cl.

| | |
|---|---|
| *H04L 15/14* | (2006.01) |
| *H04L 1/00* | (2006.01) |
| *H04L 15/00* | (2006.01) |
| *H04W 28/02* | (2009.01) |
| *H04W 74/04* | (2009.01) |
| *H04L 5/14* | (2006.01) |
| *H04L 5/00* | (2006.01) |
| *H04W 88/18* | (2009.01) |
| *H04W 84/12* | (2009.01) |

(52) U.S. Cl.
CPC .............. *H04L 5/14* (2013.01); *H04L 1/0002* (2013.01); *H04L 5/0055* (2013.01); *H04W 28/0268* (2013.01); *H04W 74/04* (2013.01); *H04W 84/12* (2013.01); *H04W 88/181* (2013.01)

(58) Field of Classification Search
CPC ....... H04L 5/14; H04L 1/0002; H04L 5/0055; H04W 28/0268; H04W 74/04
USPC .......................................................... 370/277
See application file for complete search history.

(56) References Cited

U.S. PATENT DOCUMENTS

| | | | |
|---|---|---|---|
| 7,164,649 B2 | 1/2007 | Walton et al. | |
| 8,873,496 B2 | 10/2014 | Moulsley et al. | |
| 8,902,764 B2 | 12/2014 | Imai et al. | |
| 9,100,964 B2 | 8/2015 | Fong et al. | |
| 9,155,077 B2 | 10/2015 | Song et al. | |
| 9,236,986 B2 | 1/2016 | Park | |
| 2002/0064167 A1* | 5/2002 | Khan | H04L 1/1819 370/410 |
| 2004/0102163 A1* | 5/2004 | Seki | H04M 1/72519 455/91 |

(Continued)

OTHER PUBLICATIONS

Office Action for U.S. Appl. No. 14/491,224, mailed Mar. 30, 2016.
(Continued)

*Primary Examiner* — Ronald B Abelson
(74) *Attorney, Agent, or Firm* — Jason H. Vick; Sheridan Ross, PC

(57) ABSTRACT

Techniques for presenting communication between two or more stations in a WLAN environment are provided. Specifically, methods are presented, that when taken alone or together, provide a device or group of devices with an efficient way for fast rate adaptation based on full duplex functionality, increasing link and network throughput. The present disclosure includes a method that provides a fast rate adaptation by leveraging full duplex in order to get immediate channel quality feedback.

25 Claims, 6 Drawing Sheets

(56) References Cited

U.S. PATENT DOCUMENTS

| | | | |
|---|---|---|---|
| 2005/0068908 A1* | 3/2005 | Qian | H04L 1/1671 370/278 |
| 2007/0064823 A1 | 3/2007 | Hwang et al. | |
| 2008/0130616 A1* | 6/2008 | Wengerter | H04L 47/10 370/345 |
| 2010/0315962 A1 | 12/2010 | Imai et al. | |
| 2011/0134836 A1 | 6/2011 | Lin et al. | |
| 2012/0207038 A1 | 8/2012 | Choi et al. | |
| 2014/0092785 A1 | 4/2014 | Song et al. | |
| 2014/0092823 A1 | 4/2014 | Song et al. | |
| 2014/0362695 A1 | 12/2014 | Ho et al. | |
| 2015/0181458 A1 | 6/2015 | Aryafar et al. | |

OTHER PUBLICATIONS

Bicket, John C. "Bit-rate Selection in Wireless Networks," Master thesis, MIT, Feb. 2005.

Chen, Chun-Cheng et al., "Rate-Adaptive Framing for Interfered Wireless Networks," IEEE INFOCOM 2007 proceedings, pp. 1325-1333.

Holland, Gavin et al., "A Rate-Adaptive MAC Protocol for Multi-hop Wireless Networks," ACM SIGMOBILE Jul. 2001, Rome, Italy, 2001, pp. 236-550.

IEEE Standards Association "Part II: Wireless LAN Medium Access Control (MAC) and Physical Payer (PHY) Specifications", IEEE Std 802.11-2012; Mar. 29, 2012.

Kamerman, Ad et al., "WaveLAN-II: A High-Performance Wireless LAN for the Unlicensed Band," Bell Labs Technical Journal, vol. 2-3, pp. 118-133, Summer 1997.

Lacage, Mathieu, et al. "IEEE 802.11 Rate Adaptation: A Practical Approach," MSWiM'04, Oct. 4-6, 2004, Venezia Italy, pp. 126-134.

Sadeghi, B. et al., "Opportunistic Media Access for Multi-Rate Ad Hoc Networks," MOBICOM'02, Sep. 23-28, 2002, Atlanta, GA, 2002, pp. 24-35.

Wong, Starsky H.Y., et al. "Robust Rate Adaptation for 802.11 Wireless Networks," MOBICOM '06; Proceedings of the 12th Annual International Conference on Mobile Computing and Networking; pp. 146-157; 2006.

Zhang, J., et al. "A Practical SNR-Guided Rate Adaptation" INFOCOM 2008; The 27th Conference on Computer Communications, IEEE, Apr. 13-18, 2008, pp. 146-150.

Notice of Allowance for U.S. Appl. No. 14/491,224, mailed Oct. 3, 2016.

* cited by examiner

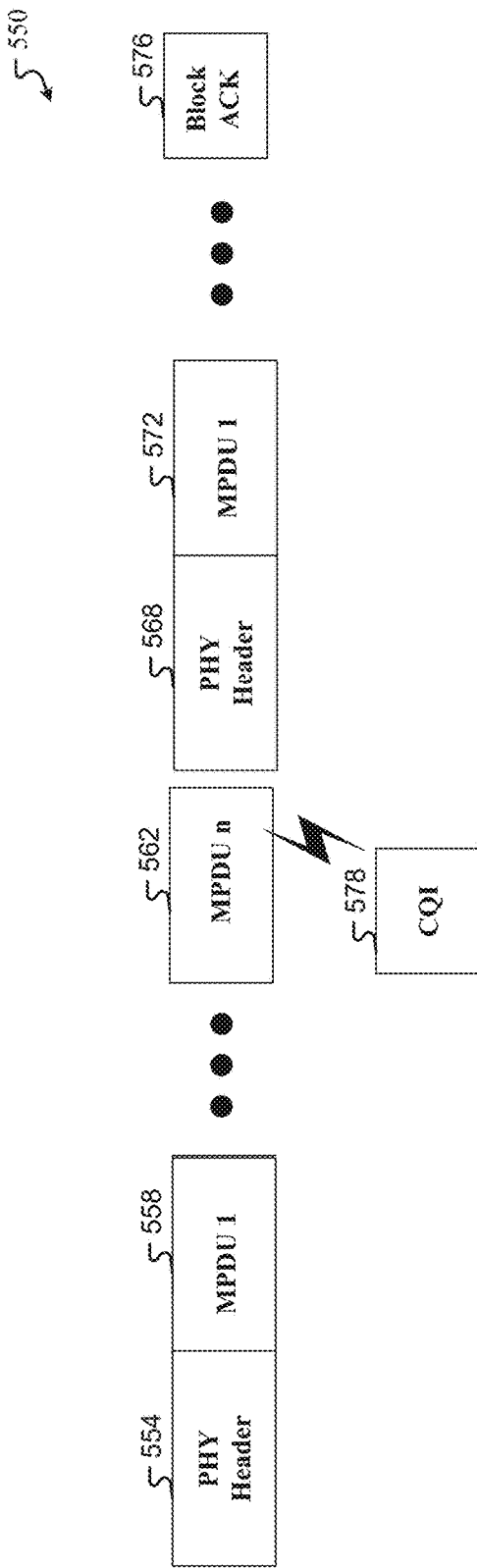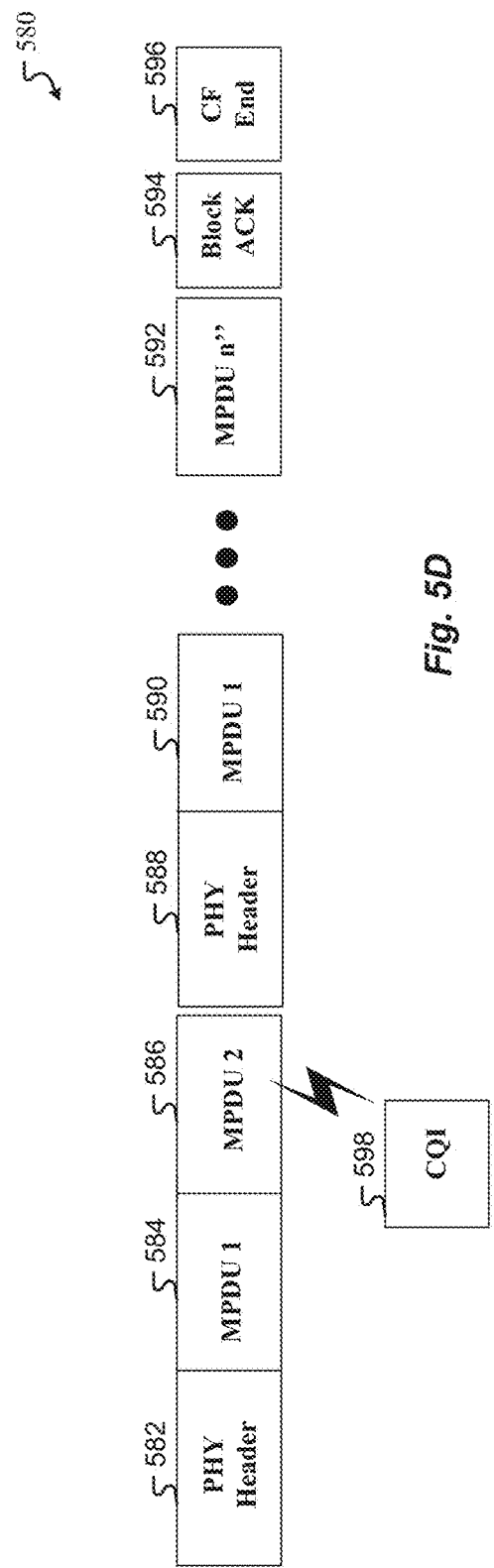
Fig. 5C
Fig. 5D

LEVERAGING FULL DUPLEX FOR RATE ADAPTATION IN WIRELESS LANS

TECHNICAL FIELD

An exemplary embodiment pertains to wireless networks. Some embodiments relate to wireless networks that operate in accordance with one of the Institute of Electrical and Electronics Engineers (IEEE) 802.11 standards including the IEEE 802.11-2012 standards. Some embodiments relate to a wireless network communicating using aggregate data frames. Exemplary embodiments also relate to the communication between two or more stations using a rate adaptation mechanism.

BACKGROUND

Technological develops such as OFDM and MIMO are being implemented at the physical layer by WLAN standards such as IEEE 802.11 in an effort to increase capacity. However, such capacity growth is stunted by the Media Access Control (MAC) layer and its large overhead. Therefore, recent developments in the IEEE 802.11 standard have be added to overcome such shortcomings. For example, in IEEE 802.11n, the concept of frame aggregation was introduced at the MAC level. In frame aggregation, multiple frames are aggregated into a single large frame with a common MAC header in an effort to decrease overhead. One such aggregate scheme is the Aggregate Media Access Control Protocol Data Unit (A-MPDU). Another development introduced is full duplex (FD) communication. Full duplex communication is a new technology that enables a wireless device to send and receive packets at the same time and on the same frequency band.

Despite these developments, the concept of link adaptation remains slow and complicated. Because the IEEE 802.11 standards support multiple transmission rates, link adaptation is a concept that is often used to estimate channel conditions and adapt the transmission rate according to the channel conditions obtained. Therefore, in order to increase throughput, the sending node needs to dynamically adjust its modulation and coding scheme based on the varying channel conditions. However, since A-MPDUs are now being used for packet transmission channel conditions remain unknown until the entire A-MPDU frame has been transmitted.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5C illustrates an exemplary frame transmission scheme with a decreased updated rate;
FIG. 5D illustrates an exemplary frame transmission scheme with an increased updated rate and Contention-Free (CF) End.

DESCRIPTION OF EMBODIMENTS

Figure 1:
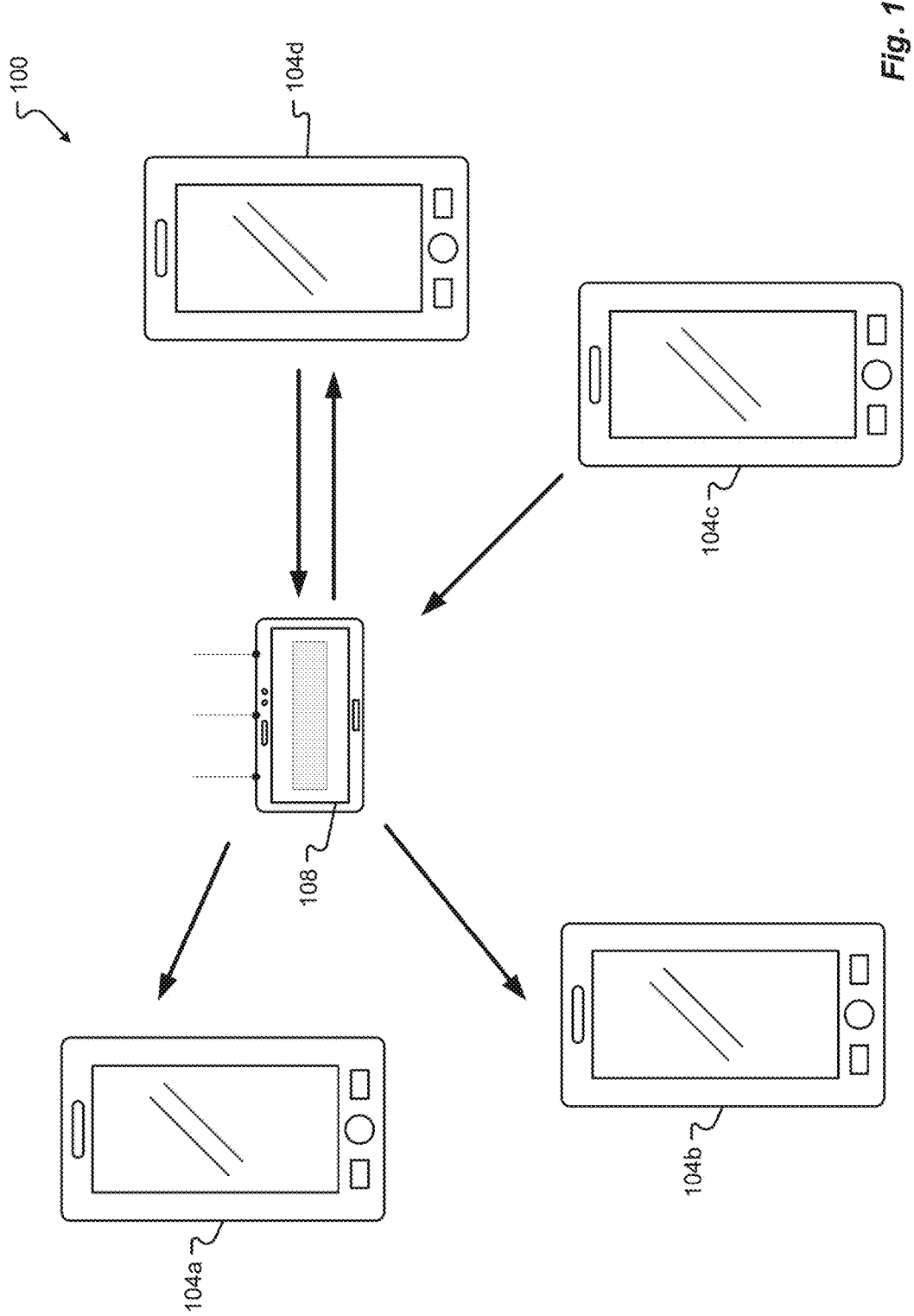
FIG. 1 illustrates an exemplary communication system.

Industry and academia have focused their attention on solving this issue. Various solutions have been proposed, but the issue remains unsolved. For example, one solution proposed resulted in low performance due to interfering CQI based on packet losses. In another solution, significant overhead was observed and incurred in the process of obtaining an accurate CQI. Still in another solution, the result deviated largely from the current standards requiring significant modifications to both the PHY and MAC header formats. Therefore, it is with these and other considerations that the present improvements have been developed.

The IEEE 802.11 standard specifies a common Medium Access Control (MAC) Layer which provides a variety of functions that support the operation of IEEE 802.11-based wireless LANs (WLANs). The MAC Layer manages and maintains communications between IEEE 802.11 stations (such as between radio network interface cards (NIC) in a PC or other wireless devices or stations (STA) and access points (APs)) by coordinating access to a shared radio channel and utilizing protocols that enhance communications over a wireless medium.

IEEE 802.11n introduced in 2009, improved maximum single-channel data rate from 54 Mbps of IEEE 802.11g to over 100 Mbps. IEEE 802.11n also introduced MIMO (multiple input/multiple output), where, according to the standard, up to 4 separate physical transmit and receive antennas carry independent data that is aggregated in a modulation/demodulation process in the transceiver.

The IEEE 802.11ac specification operates in the 5 GHz band and adds channel bandwidths of 80 MHz and 160 MHz with both contiguous and non-contiguous 160 MHz channels for flexible channel assignment. IEEE 802.11ac also adds higher order modulation and supports multiple concurrent downlink transmissions ("multi-user MIMO" (MU-MIMO)), which allows transmission to multiple spatial streams to multiple clients simultaneously. By using smart antenna technology, MU-MIMO enables more efficient spectrum use, higher system capacity and reduced latency by supporting up to four simultaneous user transmissions. IEEE 802.11ac streamlines the existing transmit beamforming mechanisms which significantly improves coverage, reliability and data rate performance.

IEEE 802.11ax is the successor to IEEE 802.11ac and is proposed to increase the efficiency of WLAN networks, especially in high density areas like public hotspots and other dense traffic areas. IEEE 802.11ax will also use orthogonal frequency-division multiple access (OFDMA). Related to IEEE 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

Embodiments may be implemented as part of Wi-Fi Alliance® Technical Committee Hotspot 2.0 Technical Task Group Hotspot 2.0 (Release 2) Technical Specification, Version 2.04, Jan. 2, 2013. However, the embodiments are not limited to IEEE 802.11 standards or Hotspot 2.0 standards. Embodiments can be used in implementation with other wireless communications standards and the like.

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, or the like; and the term "controller" means any device, system or part thereof that controls at least one operation, such a device may be implemented in hardware, circuitry, firmware or software, or combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, cellular networks, wireless local area networks and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a wireless device can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a network operation or management device, a node or collocated on a particular node of a distributed network, such as a communications network. As will be appreciated from the following description, and for reasons of computational efficiency, the components of the system can be arranged at any location within a distributed network without affecting the operation thereof.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, this disclosure is intended to include corresponding and complementary receiver-side functionality in both the same transceiver and/or another transceiver(s), and vice versa.

Presented herein are embodiments of systems, processes, methods, etc. The embodiments may relate to a communication device and/or communication system. The communication system can include a Wireless Local Area Network (WLAN) connection. A WLAN connection can include communication and association between two or more stations or wireless devices via Aggregate-Media Access Control Protocol Data Unit (A-MPDU) frames. The overall design and functionality of the system described herein is, as one example, of a means for providing a more efficient MAC by using rate adaptation that leverages full-duplex functionality.

One embodiment provides novel networking mechanisms that enable rate adaptation that leverage full duplex functionality at the transmitter. The technique can generally reduce the time required for receiving channel quality information in order to adapt the transmission rate when environmental conditions provide for a different transmission rate than that which is currently transmitted. As a result, higher system throughput is achieved as the signal transmission is terminated and retransmitted at its updated rate. Other advantages exist as well as will be discussed herein.

A communication environment 100 may include communication between various devices and stations as shown in FIG. 1. The communication environment 100 can contain multiple communication points/station(s) (STA) 104a, 104b, 104c, and 104d. The STAs 104a-104d can be any one of a laptop computer, smartphone, wireless device, notebook, subnotebook, a tablet or other electronic computing device or communications device or videogame device, or entertainment device, or the like. The communication environment 100 can also include one or more Access Points 108. The AP 108 can communicate via a communication channel using uplink and/or downlink transmission with any one or more of STAs 104a-104d. The communication can be at least one of half-duplex or full-duplex.

Full duplex (FD) communications is a communication technology that enables a wireless devices (e.g., STA 104, AP 108, etc.) to send and receive packets at the same time and on the same frequency band. FD communications provide a natural solution for transmitters to receive immediate feedback on channel conditions. As an example, AP 108 can communicate or transmit packets to STA 104a and/or STA 104b. As another example, AP 108 can receive packets from STA 104c. Still in another example, AP 108 can simultaneously transmit and receive packets from STA 104d. In addition, AP 108 can simultaneously transmit packets to STA 104a while receiving packets from STA 104c in a full-duplex system. Similarly, AP 108 can transmit and receive packets from STAs 104b and 104c. The transmission and reception configurations described herein are not so limited, as other configurations are possible between the AP/STA, STA/AP, STA/STA, AP/AP, and other wired and/or wireless devices.

Figure 2:
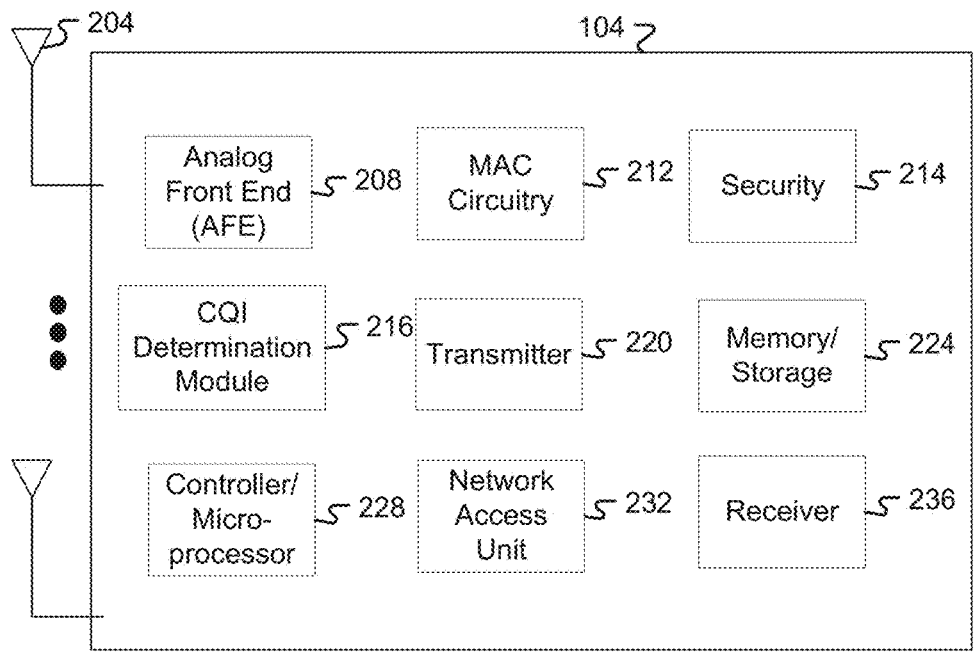
FIG. 2 illustrates an exemplary station (STA)

An example of a station (STA) 104 architecture is shown in FIG. 2. The STA 104 may comprise hardware circuitry and/or software that conduct various operations. The STA 104 also includes conventional and well known components which have been omitted for clarity. The operations can include, but are not limited to, conducting calls, synchronizing with other APs 108, opening multiple applications, presenting information through audio and/or video means, communicating via a WLAN, etc. The STA 104 can be any type of computing system operable to conduct the operations described here. As an example, the STA 104 can be a mobile phone which includes and interacts with various modules and components 208-236 as shown in FIG. 2.

The STA 104 can have one more antennas 204, for use in wireless communications such as multi-input multi-output (MIMO) communications, Bluetooth®, etc. The antennas 204 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

Antennas 204 generally interact with an Analog Front End (AFE) module 208, which enables the correct processing of the received modulated signal. The AFE 208 is functionally located between the antenna and a digital baseband system in order to convert the analog signal into a digital signal for processing.

The STA 104 can also include a controller/microprocessor 228 and a memory/storage 224. The STA 104 can interact with the memory/storage 224 which may store information and operations necessary for configuring and transmitting or receiving the message frames described herein. The memory/storage 224 may also be used in connection with the execution of application programming or instructions by the controller/microprocessor 228, and for temporary or long term storage of program instructions and/or data. As examples, the memory/storage 224 may comprise a computer-readable device, RAM, ROM, DRAM, SDRAM or other storage devices and media.

The controller/microprocessor 228 may comprise a general purpose programmable processor or controller for executing application programming or instructions related to the STA 104. Further, controller/microprocessor 228 can perform operations for configuring and transmitting message frames as described herein. The controller/microprocessor 228 may include multiple processor cores, and/or implement multiple virtual processors. Optionally, the controller/microprocessor 228 may include multiple physical processors. By way of example, the controller/microprocessor 228 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The STA 104 can further include a transmitter 220 and receiver 236 which can transmit and receive signals, respectively, to and from other STAs 104 or access points 108 using one or more antennas 204. Included in the STA 104 circuitry is the medium access control or MAC Circuitry 212. MAC circuitry 212 provides the medium for controlling access to the wireless medium. In an exemplary embodiment, the MAC circuitry 212 may be arranged to contend for a wireless medium and configure frames or packets for communicating over the wireless medium.

The CQI Determination Module 216 can work with the MAC circuitry 212 and is a module that can be used in determining the CQI based on the information received from another STA 104 or AP 108. Information determined and included in CQI can include but is not limited to the system's Signal-to-Noise Ratio (SNR), updated Modulation and Coding Scheme (MCS), received signal strength, updated transmission rate, receiver identification, etc. The CQI Determination Module 216 can work with or independently of the Memory/Storage 224 and Controller/Microprocessor 228 in determining channel statistics for feedback to the transmitter. The CQI Determination Module 216 can also be used to determine and/or insert correct packet detection information in the CQI that will be fed back to the transmitter in order to improve throughput and MAC efficiency.

The STA 104 can also contain a security module 214. This security module 214 can contain information regarding but not limited to, security parameters required to connect the STA 104 to AP 108 or other available networks, and can include WEP or WPA security access keys, network keys, etc. The WEP security access key is a security password used by Wi-Fi networks. Knowledge of this code will enable the STA 104 to exchange information with the access point 108. The information exchange can occur through encoded messages with the WEP access code often being chosen by the network administrator. WPA is an added security standard that is also used in conjunction with network connectivity with stronger encryption than WEP.

Another module that the STA 104 can include is the network access unit 232. The network access unit 232 can be used for connecting with the AP 108. In one exemplary embodiment, connectivity can include synchronization between devices. In another exemplary embodiment, the network access unit 232 can work as a medium which provides support for communication with other stations. In yet another embodiment, the network access unit 232 can work in conjunction with at least the MAC circuitry 212.

The network access unit 232 can also work and interact with one or more of the modules described herein.

The modules described and others known in the art can be used with the STA 104 and can be configured to perform the operations described herein in conjunction with FIG. 1 and FIGS. 3-6.

Figure 3:
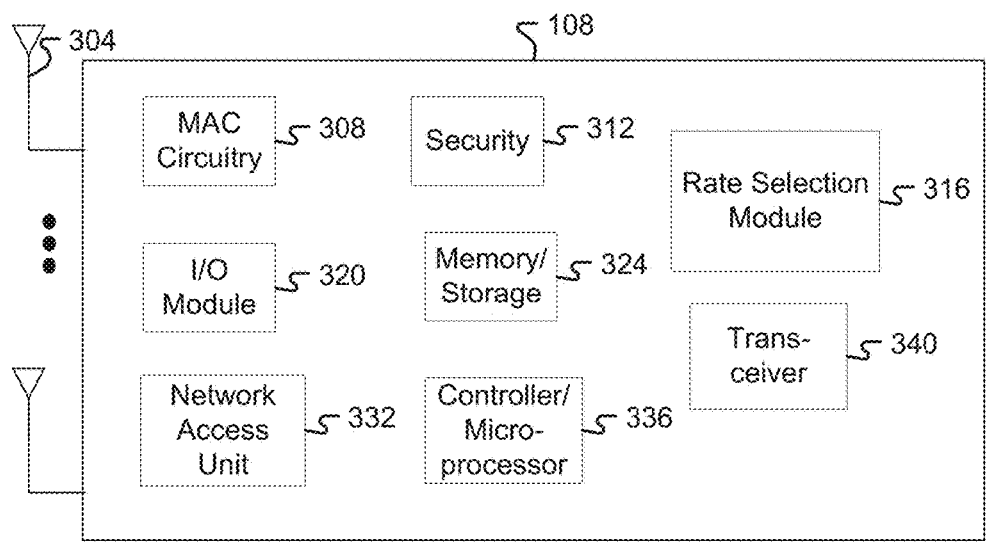
FIG. 3 illustrates an exemplary access point (AP)

An example of the Access Point 108 architecture is shown in FIG. 3. The AP 108 may comprise hardware and/or software that conduct various operations. The AP 108 also includes conventional and well known components which have been omitted for clarity. The operations can include, but are not limited, communicating with STAs, acknowledging packet receipt, synchronizing with STAs 104, receiving and processing data frames, etc. The access point 108 can be any type of computing system operable to conduct the operations described here. As an example, the access point 108 can be a router which includes and interacts with various modules and components 308-340 as shown in FIG. 3.

The AP 108 can have one more antennas 304, for use in wireless communications such as multi-input single-output (MISO), single-input multi-output (SIMO), MIMO or the like. The antennas 304 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

The access point 108 can also include a controller/microprocessor 336 and a memory/storage 324. The access point 108 can interact with the memory/storage 324 which may store information and operations necessary for configuring and transmitting or receiving the message frames described herein. The memory/storage 324 may also be used in connection with the execution of application programming or instructions by the controller/microprocessor 336, and for temporary or long term storage of program instructions and/or data. As examples, the memory/storage 324 may comprise a computer-readable device, RAM, ROM, DRAM, SDRAM or other storage devices and media.

The controller/microprocessor 336 may comprise a general purpose programmable processor or controller for executing application programming or instructions related to the access point 108. Further, controller/microprocessor 336 can perform operations for configuring and transmitting beacons as described herein. The controller/microprocessor 336 may include multiple processor cores, and/or implement multiple virtual processors. Optionally, the controller/microprocessor 336 may include multiple physical processors. By way of example, the controller/microprocessor 336 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

An input/output (I/O) module 320 can also be part of the AP 108 architecture. The input/output module 320 and associated ports may be included to support communications over wired or wireless networks or links. For example, I/O module 320 can provide communication with wireless devices, STAs 104, servers, communication devices, and/or peripheral devices. Examples of an input/output module 320 include an Ethernet port, a Universal Serial Bus (USB) port, Institute of Electrical and Electronics Engineers (IEEE) port 1394, or other interface.

The access point 108 can further include a transceiver 340 which can transmit and receive signals to and from STAs 104 or APs 108 and/or the Internet using one or more antennas, 204 and 304 respectively, and/or hard-wired links (not shown). Included in the AP 108 architecture is the medium access control or MAC circuitry 308. MAC circuitry 308 provides the medium for controlling access to the wireless medium. In an exemplary embodiment, the MAC circuitry 308 may be arranged to contend for a wireless medium and configure frames or packets for communicating over the wireless medium. The MAC circuitry module 308 can work together or independently of a network access unit 332, which can aid in the communication between stations 104 and connecting to them. In one exemplary embodiment, the connectivity can include synchronization between devices. The network access unit 332 can also work and interact with one or more of the modules described herein.

The Rate Selection Module 316 can also be part of the AP 108 architecture and can, but is not limited to, determining the updated transmission rate based on the CQI information received from a communication device such as, STA 104. The Rate Selection Module 316 can also compute the throughput of the current transmission and compare the throughput to that of the updated rate computed. In finding the throughput, the Rate Selection Module 316 can determine if termination of the current transmission is the best choice and if the system gains from making the rate adjustment. Further, Rate Selection Module 316 can interact with the MAC Circuitry 308 to leverage full duplex communication avoiding MAC and PHY header modifications while still providing rate adaptation through immediate channel feedback. Note that the Rate Selection Module 316 can also exist in a client device, mobile handset, station, etc.

AP 108 can also contain a security module 312. This security module 312 can contain information regarding, but not limited to, security parameters required to connect the STA 104 to AP 108 or other available networks, and can also include WEP or WPA security access keys, network keys, etc. The WEP security access key is a security password used by Wi-Fi networks. Knowledge of this code will provide the wireless device 104 with access to exchange information with the access point 108. The information exchange can occur through encoded messages and WEP access code is often chosen by the network administrator. WPA is an added security standard that is also used in conjunction with network connectivity with stronger encryption than WEP.

The modules described and others known in the art can be used with the access point 108 and can be configured to perform the operations described herein and in conjunction with FIGS. 1-2 and FIGS. 4-6.

Figure 4:
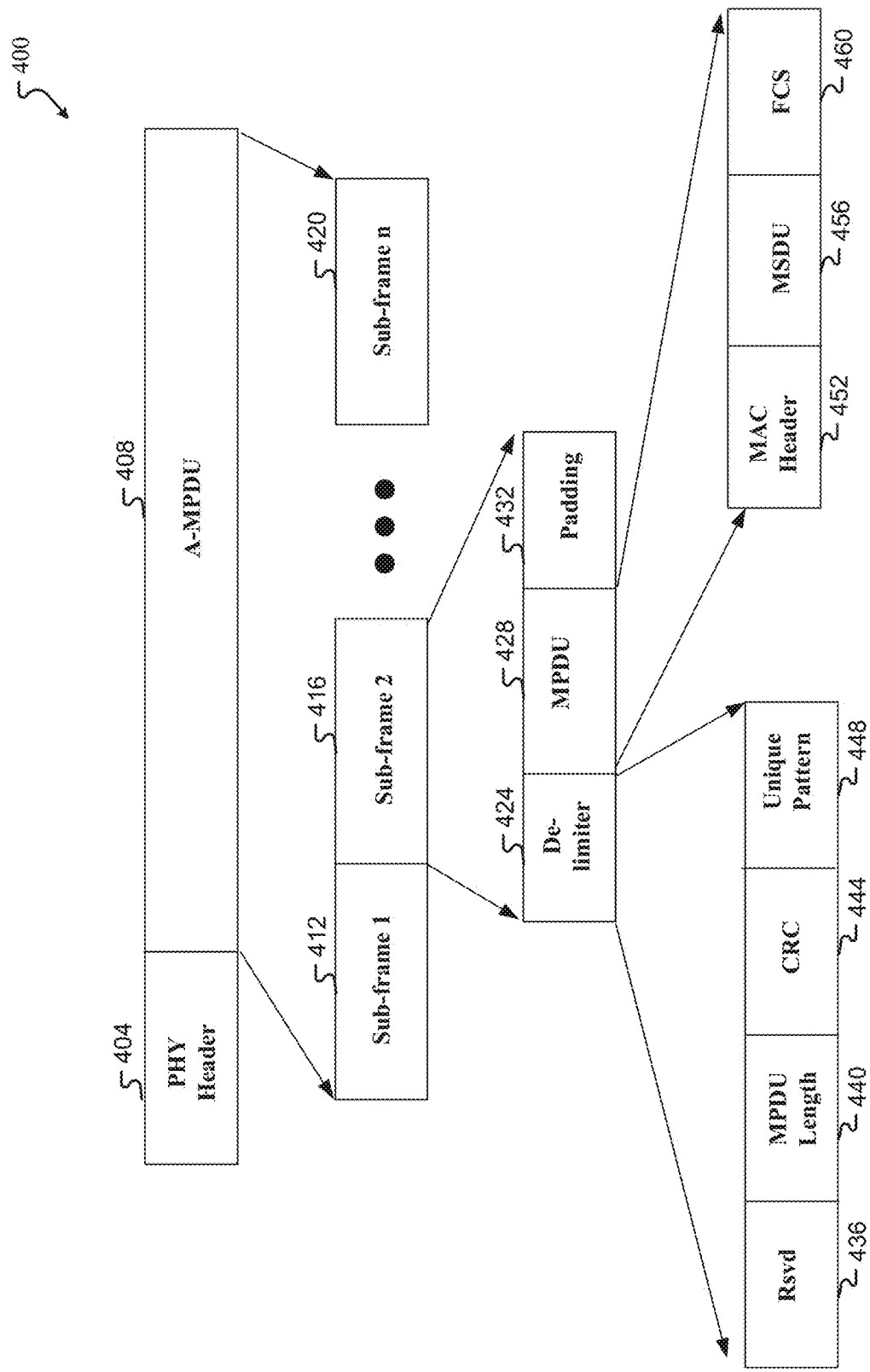
FIG. 4 illustrates an exemplary A-MPDU frame format.

The AP 108 can oftentimes communicate with other wireless devices such as STA 104, through the use of Aggregate MAC Protocol Data Units (A-MPDU) for frame transmission. A-MPDU is a frame transmission mechanism that was established by the standards bodies such as but not limited to, IEEE 802.11n and IEEE 802.11ac, in order to improve Media Access Control (MAC) efficiency. FIG. 4 is an exemplary embodiment of an Aggregate MAC Protocol Data Unit (A-MPDU) frame format 400.

The A-MPDU 408 is a frame that contains multiple sub-frames 412, 416, 420, often referred to as MPDUs, and a PHY Header 404. By aggregating multiple sub-frames 412, 416, 420, a system is able to transmit more information using a single PHY Header 404.

The sub-frames 412, 416, 420, each comprise a delimiter 424, the MPDU 428 and padding 432. Padding 432 can be added so that the fields within the delimiter 424 meet the length requirements. The MPDU delimiter 424 is a field that is used to locate MPDUs within an A-MPDU. The MPDU delimiter 424 field is placed in the sub-frame to aid in A-MPDU recovery in the instance where one or more MPDU delimiters are received with errors. The delimiter 424 is generally a set of octets which contains information about the MPDU 428. The information contained within the delimiter can include the MPDU length 440, cyclic redundancy check bits (CRC) 444, Reserved (Rsvd) bits 436, and unique pattern/delimiter signature 448. The MPDU length 440 is a field designed to contain the length of the MPDU. A zero can be used to designate that no MPDU is present. The delimiter signature or unique pattern 448 is a pattern that may be used to detect an MPDU delimiter 424 when scanning for the MPDU delimiter 424.

Each Medium Access Control (MAC) Protocol Data Unit (MPDU) 428 contains a MAC header 452, MAC Service Data Unit (MSDU) 456, and an individual frame check sequence (FCS) 460. The MAC Header 452 is a field within the MPDU 424 which contains information including, but not limited to, frame control data, duration, receiver address, (Quality of Service) QoS control information, etc. MSDU 456 contains the payload information, while the FCS 460 contains the frame check sequence.

Figure 5A:
FIG. 5A illustrates an exemplary frame transmission scheme.

Generally, in a system using aggregate transmission, the standard A-MPDU 456 is transmitted and followed by frame acknowledgement by the receiver. FIG. 5A illustrates the frame transmission between the transmitter and the receiver through A-MPDU frame 500 aggregation. The A-MPDU, as previously described, is a large frame with a single PHY Header 504 and n sub-frames or MPDUs 504, 508, 510, 512. In general, in the transmission between a transmitter and a receiver, a transmitter will transmit the PHY Header 504, followed by the MPUs 508, 510, 512, and upon completion of the transmission, the receiver will respond with an Acknowledgement signal (Block ACK) 516 acknowledging receipt of the A-MPDU.

In most instances, if an A-MPDU is transmitted, transmission of the entire frame occurs before any feedback from the receiver is obtained at the transmitter. The feedback from the receiver can often include information identifying the receiver and indicating receipt of information. However, as described above, this transmission does not take full advantage of full-duplex functionality. That is to say, it may be possible that midway through an A-MPDU transmission, channel conditions may permit higher throughput through increased data rate. Alternatively, the channel conditions may warrant a decrease in data rate in which case having the opportunity to perform rate adaptation is advantageous.

In this scenario, a system capable of an increased data rate, would begin much like FIG. 5A above. The transmission would begin with a transmission of the PHY Header of the A-MPDU frame, followed by multiple sub-frames/MPDUs. Next, a transmitter, leveraging a system's full duplex functionality, can be adapted to perform at an updated rate. FD communications provide a natural solution for the transmitter to receive immediate feedback on channel conditions and thus adapt the transmission rate.

Figure 5B:
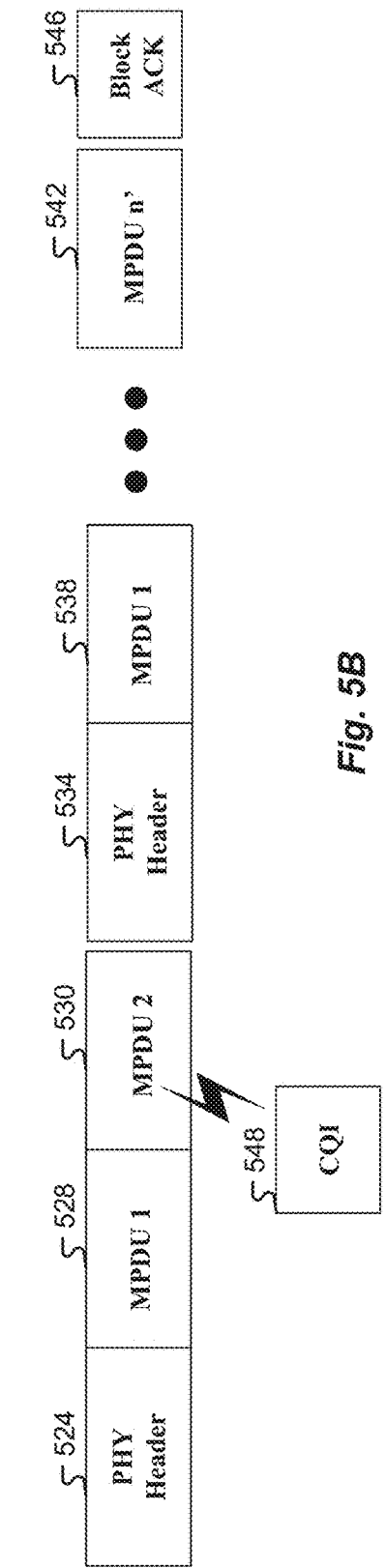
FIG. 5B illustrates an exemplary frame transmission scheme with an increased updated rate.

FIG. 5B illustrates this, where the channel is capable of supporting a higher data rate than originally selected and the system adapts accordingly. Specifically, FIG. 5B, illustrates an exemplary frame transmission with an increased updated rate.

For example, as depicted in FIG. 5B, frame transmission between the transmitter and the receiver begins with the transmission of a PHY header 524 followed by the MPDUs. However, unlike the standard A-MPDU transmission, this transmission includes receiver feedback mid-stream. Here, as soon as an MPDU is decoded at the receiver (i.e., MPDU 1 528), the transmitter receives Channel Quality Information (CQI) 548 from the receiver. Therefore, with the system's full-duplex functionality, while the transmitter is transmitting the next MPDU (i.e., MPDU 2 530), the transmitter is also receiving CQI 548. The CQI 548 can include information such as, but not limited to Signal to Noise Ratio (SNR), Signal to Interference Plus Noise Ratio (SINR), updated MCS, received signal strength, updated transmission rate, receiver identification, etc. In some instances, the MDPU can be transmitted without the payload in order to obtain CQI 548 and possibly receiver information without the overhead and MAC complexity included in decoding the payload. In other instances and/or in addition to receiver identification, CQI can include an indication of correct reception of the MPDU sub-frame. By transmitting an indication of a correctly received MPDU, system throughput can be improved as the correctly transmitted MPDU would not need re-transmission.

Upon reception of the CQI 548 information by the transmitter, the transmitter can decide if it gains throughput by terminating its current transmission and starting a new transmission at a higher rate. In this example, the transmitter decides that it gains throughput based on CQI 548 received, and the updated transmission is better that the current transmission. Therefore, the decision to terminate the current transmission is made and a new A-MPDU frame is transmitted, including the PHY Header 534 and MPDU 1 538, etc.

Note that as determined by the transmitter, a higher transmission rate was possible and thus more data is sent for the same aggregate transmission time. The increase in information is denoted by MPDU n', where n'>n. Upon completion of the re-transmitted A-MPDU frame, the receiver will transmit the Block ACK 546 signal as procedurally known.

In some instances, upon reception of the CQI from the receiver, the transmitter can determine that the updated rate is at a lower rate. FIG. 5C illustrates an exemplary frame transmission 550 with a decreased updated rate. As indicated in the A-MPDU transmission 550 illustrated in FIG. 5C, the A-MPDU initial transmission remains unmodified and begins with transmission of the PHY Header 554. Following the PHY Header 554, the sub-frames/MPDU frames 558, 562, 572 proceed. However, like the embodiment of FIG. 5C, the use of full duplex functionality can be leveraged and CQI 578 can be transmitted from the receiver upon successful decoding of the MPDU. In instances, where the transmission rate is higher than the updated rate, it is likely that the receiver cannot correctly identify itself as the intended receiver. This is because the receiver address is part of the MAC header and is transmitted at the payload data rate, as seen above and in conjunction with FIG. 4. As a result, the receiver may not be able to send back the CQI to the transmitter upon reception of the first MPDU since the sub-frame may likely not pass the FCS.

However, because a channel is probabilistic, an instance will occur where the receiver is able to decode one of the sub-frames. That is, successful decoding of the MPDU may not occur for a few sub-frames (i.e., MPDU n 562) and thus, CQI 578 information is still received at the transmitter, just delayed. In some instances, the CQI 578 information can include receiver identification. In other instances, in addition to or alternatively, the MPDU sub-frames transmitted may not include payload information. By not including the payload information, the receiver is able to more quickly decode the MAC header and transmit the CQI 578 information.

Upon reception of the CQI 578, the transmitter is able to determine the updated data rate for transmission. To do so, it can, for example, determine the expected throughput if it continues with its current transmission against the case where the transmitter terminates its transmission and re-transmits at a different rate (i.e., at a lower data rate). One objective is for the transmitter to opportunistically transmit a larger number of correctly received packets for the same transmission time opportunity of a legacy system. By identifying the correct rate, link throughput is increased.

As illustrated in FIG. 5C, CQI 578 was received at MPDU n 562, and re-transmission of the A-MPDU was a better solution. Therefore, the transmitter determines to terminate and re-transmits starting with the PHY Header 568 and followed by the MPDUs (i.e, MPDU 1 572) at a lower rate.

An advantage in leveraging from the systems full-duplex functionality is the ability increase data throughput through the increase in rate as depicted in FIG. 5B. In some instance, where the transmitter receives the CQI 598 and determines to terminate and re-transmit at a higher rate, the system may be able to complete transmission in a time faster than originally determined and as a result the Block ACK 594 is received within a smaller interval of time than originally designated by the PHY Header 582.

For example, PHY Header 582 is transmitted to the intended receiver, MPDU 1 584 and MPDU 2 586 follow. During transmission of MPDU 2 586, and because of the system's full duplex capability, the transmitter receives CQI 598. In some instances, receiver identification is included in the CQI 598. In other instances, correct frame reception identification is also or alternatively included with CQI 598. The transmitter then determines that the system gains throughput from re-transmission. Re-transmission begins with PHY Header 588 followed by MPDU 1 590 and ends with MPDU n" 592. Block acknowledgement, Block ACK 594 is received at the transmitter. In one example, reception of the Block ACK 594, can be received before the time allotted by the network for this transmission has expired and as indicated in the PHY Header 582. In this instance, the transmitter can transmit a Contention-Free End (CF-END) 596 signal indicating the end of transmission. By transmitting a CF-END, neighboring STAs can turn their radios on at an earlier time than indicated by the Network Allocation Vector (NAV) and thus can access the medium at an earlier time. The overhearing nodes can correctly reset their NAV vectors and restart contending for the medium, increasing the network throughput.

Figure 6:
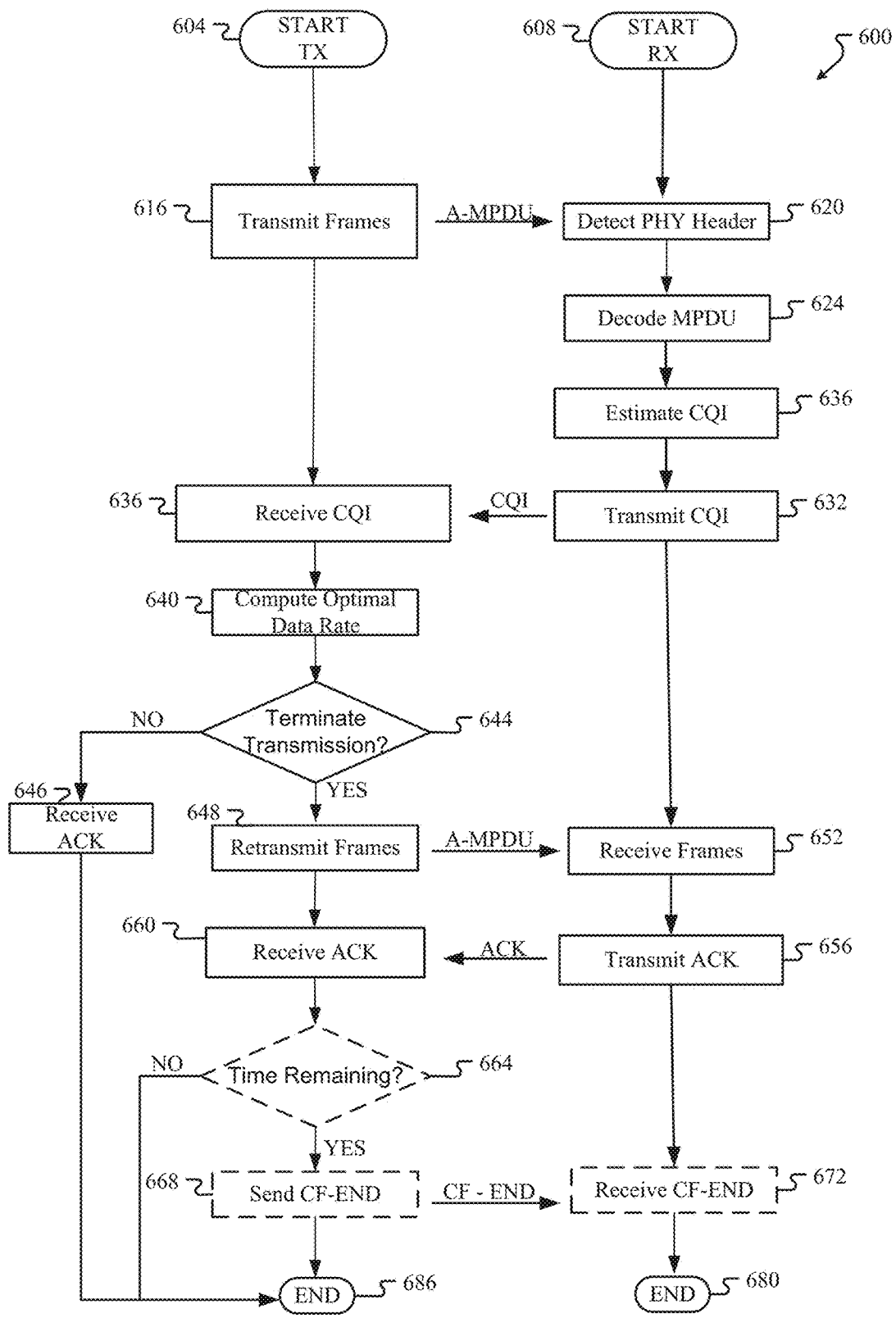
FIG. 6 is a flowchart illustrating frame transmission with rate adaptation.

FIG. 6 outlines an exemplary flowchart illustrating frame transmission with rate adaptation. In particular, association between two devices, such as a station and a wireless device/AP, begins at step 604 and 608, for each device respectively, and continues to step 616. In step 616, the AP is transmitting frames (i.e., A-MPDUs). The A-MPDU frame is received at the STA and its PHY Header is detected in step 620. The PHY Header as described above and in conjunction with FIG. 4 can contain details regarding the duration of the frame, frame control data, Quality of Service (QoS) control information, etc. Soon after detection and reception of the PHY Header, the sub-frames or MDPUs are received and one is decoded in step 624. Using the information received from the decoded MPDU on step 624, the STA can estimate the Channel Quality Information (CQI) in step 636. The CQI can contain details including optimum MCS, Signal-to-Noise Ratio (SNR), channel statistics, receiver ID and other such details that can aid the transmitter determine an optimum transmission rate. The CQI is transmitted at step 632 and received by the AP in step 636. Upon reception of the CQI, the AP can use the information to compute an updated transmission rate in step 640.

In some instances, as discussed above, the transmission is made such that only header information (i.e., no payload) is sent within one or more of the MPDUs in order to obtain quicker CQI information. By removing the payload from the initial transmission, quicker feedback is received by the AP and the MAC's processing is decreased as the payload does not require decoding.

By determining the updated transmission rate in step 640, the AP can then determine if throughput at the current rate is greater or smaller than the updated rate. If the AP determines that the system is best at its current rate, then transmission of the A-MPDU continues to completion and receipt of the Block ACK from the STA is obtained at step 646, and the process ends at step 686. Alternatively, if the AP determines that the current rate needs to be adjusted and/or that the system gains from an adjustment, then the decision is made by the AP to terminate the current transmission at step 644 and re-transmit the frames at 648.

The A-MPDU is re-transmitted as discussed above and in conjunction with FIGS. 5B-5D beginning with the PHY Header and followed by the MPDUs or sub-frames. The STA receives the retransmitted frames in step 652 and upon completion reception of the frame transmits a Block ACK to the AP in step 656. The STA receives the Block ACK in step 660 which acknowledges to the AP receipt of the A-MPDU frame.

Optionally, the AP in step 664 can check for time remaining in the transmission as indicated in the PHY Header and established by the NAV. If no time is left, the process ends at step 686. Alternatively, if time still remains, then the AP can transmit, in step 668, a Contention Free (CF-END) message. The CF-END message is received by the STA in step 672 which can provide an indication that the medium is now available and other neighboring devices can now turn their radios on. Once the CF-END message has been received, the process ends in step 680. Further details describing rate adaptation and frame transmission are explained in greater detail above and in conjunction with FIGS. 1-5.

Embodiments are thus directed toward a wireless device for transmitting frames, comprising: a memory; a transceiver, the transceiver configured to: transmit a plurality of data frames; and receive channel quality information, wherein the channel quality information is received during transmission of the plurality of data frames; a processor and a rate selection module, the processor and the rate selection module configured to: compute an updated data rate, wherein the updated data rate is determined at least based in part on the channel quality information received; and terminate transmission of the plurality of data frames if the updated data rate provides an increase in throughput; and the transceiver further configured to: re-transmit the plurality of data frames; and receive a block acknowledgement. Aspects of the above wireless device include wherein the data frames are an Aggregate-Media Access Control Protocol Data Unit (A-MPDU). Aspects of the above wireless device include wherein the channel quality information is received during a full duplex communication. Aspects of the above wireless device include wherein at least one of the plurality of data frames does not include payload information. Aspects of the above wireless device include wherein the channel quality information includes a receiver identification. Aspects of the above wireless device include wherein the channel quality information includes correct packet receipt identification. Aspects of the above wireless device include wherein the updated data rate can be faster or slower than an actual transmission rate. Aspects of the above wireless device include wherein receipt of the block acknowledgement occurs before a predetermined time. Aspects of the above wireless device include wherein if the block acknowledgement occurs before a predetermined time, a Contention-Free End (CF-END) signal is sent. Aspects of the above wireless device include wherein the CF-END signal alerts the network the medium is available for contention. Aspects of the above wireless device further comprising determining not to terminate transmission if the updated data rate does not provide an increase throughput.

Embodiments include a method for transmitting frames, the method comprising: transmitting, by a transceiver, a plurality of data frames; receiving, by the transceiver, channel quality information, wherein the channel quality information is received during transmission of the plurality of data frames; computing, by a rate selection module, an updated data rate, wherein the updated data rate is determined at least based in part on the channel quality information received; determining, by the rate selection module, to terminate transmission if the updated data rate provides an increase in throughput; re-transmitting, by the transceiver, the plurality of data frames; and receiving, by the transceiver, a block acknowledgement. Aspects of the above method include wherein the data frames are an Aggregate-Media Access Control Protocol Data Unit (A-MPDU). Aspects of the above method include wherein the channel quality information is received during a full duplex communication. Aspects of the above method include wherein at least one of the plurality of data frames does not include payload information. Aspects of the above method include wherein the channel quality information includes a receiver identification. Aspects of the above method include wherein the channel quality information includes correct packet receipt identification. Aspects of the above method include wherein the updated data rate can be faster or slower than an actual transmission rate. Aspects of the above method include wherein receipt of the block acknowledgement occurs before a predetermined time. Aspects of the above method include wherein if the block acknowledgement occurs before a predetermined time, a Contention-Free End (CF-END) signal is sent. Aspects of the above method include wherein the CF-END signal alerts the network the medium is available for contention. Aspects of the above method further comprising determining not to terminate transmission if the updated data rate does not provide an increase throughput.

Embodiments include a non-transitory computer readable medium having instructions thereon that when executed by at least one processor of a wireless device perform a method comprising: transmitting, by a transceiver, a plurality of data frames; receiving, by the transceiver, channel quality information, wherein the channel quality information is received during transmission of the plurality of data frames; computing, by a rate selection module, an updated data rate, wherein the updated data rate is determined at least based in part on the channel quality information received; determining, by the rate selection module, to terminate transmission if the updated data rate provides an increase in throughput; re-transmitting, by the transceiver, the plurality of data frames; and receiving, by the transceiver, a block acknowledgement. Aspects of the above media include wherein the data frames are an Aggregate-Media Access Control Protocol Data Unit (A-MPDU). Aspects of the above media include wherein the channel quality information is received during a full duplex communication. Aspects of the above media include wherein at least one of the plurality of data frames does not include payload information. Aspects of the above media include wherein the channel quality information includes a receiver identification. Aspects of the above media include the channel quality information includes correct packet receipt identification. Aspects of the above media include wherein the updated data rate can be faster or slower than an actual transmission rate. Aspects of the above media include wherein receipt of the block acknowledgement occurs before a predetermined time. Aspects of the above media include wherein if the block acknowledgement occurs before a predetermined time, a Contention-Free End (CF-END) signal is sent. Aspects of the above media include wherein the CF-END signal alerts the network the medium is available for contention. Aspects of the above media further comprising determining not to terminate transmission if the updated data rate does not provide an increase throughput.

Embodiments include a system for transmitting frames, the system comprising: means for transmitting a plurality of data frames; means for receiving channel quality information, wherein the channel quality information is received during transmission of the plurality of data frames; means for computing an updated data rate, wherein the updated data rate is determined at least based in part on the channel quality information received; means for determining to terminate transmission if the updated data rate provides an increase in throughput; means for re-transmitting the plurality of data frames; and means for receiving a block acknowledgement. Aspects of the above system include wherein the data frames are an Aggregate-Media Access Control Protocol Data Unit (A-MPDU). Aspects of the above system include wherein the channel quality information is received during a full duplex communication. Aspects of the above system include wherein at least one of the plurality of data frames does not include payload information. Aspects of the above system include wherein the channel quality information includes a receiver identification. Aspects of the above system include wherein the channel quality information includes correct packet receipt identification. Aspects of the above system include wherein the updated data rate can be faster or slower than an actual transmission rate. Aspects of the above system include wherein receipt of the block acknowledgement occurs before a predetermined time. Aspects of the above system include wherein if the block acknowledgement occurs before a predetermined time, a Contention-Free End (CF-END) signal is sent. Aspects of the above system include wherein the CF-END signal alerts the network the medium is available for contention. Aspects of the above system further comprising determining not to terminate transmission if the updated data rate does not provide an increase throughput.

The exemplary embodiments are described in relation to rate adaptation in a full-duplex system in a wireless communication between two or more devices. However, it should be appreciated, that in general, the systems and methods herein will work equally well for any type of communication system in any environment utilizing any one or more protocols including wired communications, wireless communications, powerline communications, coaxial cable communications, fiber optic communications and the like.

The exemplary systems and methods are described in relation to IEEE 802.11 transceivers and associated communication hardware, software and communication channels. However, to avoid unnecessarily obscuring the present disclosure, the following description omits well-known structures and devices that may be shown in block diagram form or otherwise summarized.

For purposes of explanation, numerous details are set forth in order to provide a thorough understanding of the present embodiments. It should be appreciated however, that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, IEEE 802.11u, WiFi, LTE, LTE Unlicensed, 4G, Bluetooth®, WirelessHD, WiGig, 3GPP, Wireless LAN, WiMAX.

The term transceiver as used herein can refer to any device that comprises hardware, software, firmware, or combination thereof and is capable of performing any of the methods described herein.

Additionally, the systems, methods and protocols can be implemented to improve on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Corte™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that systems and methods for an adaptive rate mechanism for communication between two or more stations have been presented. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A wireless device, comprising:
a memory;
a transceiver, the transceiver configured to:
  transmit a plurality of data frames; and
  receive channel quality information, wherein the channel quality information is received during transmission of the plurality of data frames;
a processor and a rate selection module, the processor and the rate selection module configured to:
  compute an updated data rate, wherein the updated data rate is determined at least based in part on the channel quality information received; and
  terminate transmission of the plurality of data frames if the updated data rate provides an increase in throughput; and
the transceiver further configured to:
  re-transmit the plurality of data frames; and
  receive a block acknowledgement, and when the block acknowledgement occurs before a predetermined time, a Contention-Free End (CF-END) signal is sent.

2. The wireless device of claim 1, wherein the data frames are an Aggregate-Media Access Control Protocol Data Unit (A-MPDU).

3. The wireless device of claim 1, wherein the channel quality information is received during a full duplex communication.

4. The wireless device of claim 1, wherein at least one of the plurality of data frames does not include payload information.

5. The wireless device of claim 1, wherein the channel quality information includes a receiver identification.

6. The wireless device of claim 1, wherein the channel quality information includes correct packet receipt identification.

7. The wireless device of claim 1, wherein the updated data rate can be faster or slower than an actual transmission rate.

8. The wireless device of claim 1, wherein receipt of the block acknowledgement occurs before a predetermined time.

9. The wireless device of claim 8, wherein after checking for a time remaining in the transmission as indicated in a PHY Header and established by a NAV, if the block acknowledgement occurs before the predetermined time, the Contention-Free End (CF-END) signal is sent.

10. The wireless device of claim 9, wherein the CF-END signal alerts the network the medium is available for contention.

11. The wireless device of claim 1, further comprising determining not to terminate transmission if the updated data rate does not provide an increase throughput.

12. A method comprising:
transmitting, by a transceiver, a plurality of data frames;
receiving, by the transceiver, channel quality information, wherein the channel quality information is received during transmission of the plurality of data frames;
computing, by a rate selection module, an updated data rate, wherein the updated data rate is determined at least based in part on the channel quality information received;
determining, by the rate selection module, to terminate transmission if the updated data rate provides an increase in throughput;
re-transmitting, by the transceiver, the plurality of data frames; and
receiving, by the transceiver, a block acknowledgement, and when the block acknowledgment occurs before a predetermined time, a Contention-Free End (CF-END) signal is sent.

13. The method of claim 12, wherein the data frames are an Aggregate-Media Access Control Protocol Data Unit (A-MPDU).

14. The method of claim 12, wherein the channel quality information is received during a full duplex communication.

15. The method of claim 12, wherein at least one of the plurality of data frames does not include payload information.

16. The method of claim 12, wherein the channel quality information includes correct packet receipt identification.

17. The method of claim 12, wherein the updated data rate can be faster or slower than an actual transmission rate.

18. The method of claim 12, wherein receipt of the block acknowledgement occurs before a predetermined time, and/or wherein after checking for a time remaining in the transmission as indicated in a PHY Header and established by a NAV, if the block acknowledgement occurs before the predetermined time, the Contention-Free End (CF-END) signal is sent, and/or wherein the CF-END signal alerts the network the medium is available for contention.

19. The method of claim 12, further comprising determining not to terminate transmission if the updated data rate does not provide an increase throughput.

20. A non-transitory computer readable medium having instructions thereon that when executed by at least one processor of a wireless device perform a method comprising:
transmitting, by a transceiver, a plurality of data frames;
receiving, by the transceiver, channel quality information, wherein the channel quality information is received during transmission of the plurality of data frames;
computing, by a rate selection module, an updated data rate, wherein the updated data rate is determined at least based in part on the channel quality information received;
determining, by the rate selection module, to terminate transmission if the updated data rate provides an increase in throughput;

re-transmitting, by the transceiver, the plurality of data frames; and receiving, by the transceiver, a block acknowledgement, and when the block acknowledgement occurs before a predetermined time, a Contention-Free End (CF-END) signal is sent.

21. The non-transitory medium of claim 20, wherein the data frames are an Aggregate-Media Access Control Protocol Data Unit (A-MPDU).

22. The non-transitory medium of claim 20, wherein the channel quality information is received during a full duplex communication.

23. The non-transitory medium of claim 20, wherein at least one of the plurality of data frames does not include payload information.

24. The non-transitory medium of claim 20, wherein receipt of the block acknowledgement occurs before a predetermined time, and/or wherein after checking for a time remaining in the transmission as indicated in a PHY Header and established by a NAV, if the block acknowledgement occurs before the predetermined time, the Contention-Free End (CF-END) signal is sent, and/or wherein the CF-END signal alerts the network the medium is available for contention.

25. The non-transitory medium of claim 20, further comprising determining not to terminate transmission if the updated data rate does not provide an increase throughput.

* * * * *